Feb. 19, 1924. 1,484,525
J. E. NOEGGERATH
MEANS FOR DAMMING UP SEMISOLID SUBSTANCES
Filed July 8, 1920
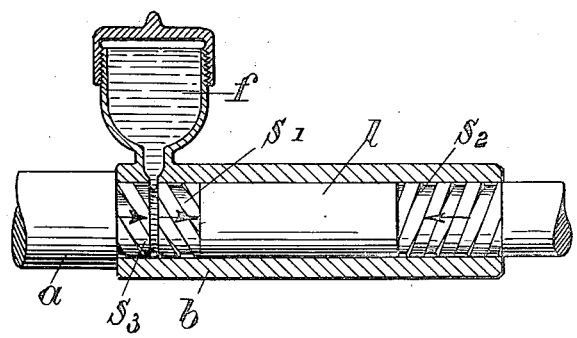
Inventor:
Jacob Emil Noeggerath

UNITED STATES PATENT OFFICE.

JACOB EMIL NOEGGERATH, OF THE HAGUE, NETHERLANDS.

MEANS FOR DAMMING UP SEMISOLID SUBSTANCES.

Application filed July 8, 1920. Serial No. 394,662.

(GRANTED UNDER THE PROVISIONS OF THE ACT OF MARCH 3, 1921, 41 STAT. L., 1313.)

*To all whom it may concern:*

Be it known that I, JACOB EMIL NOEGGERATH, a citizen of the United States, residing at The Hague, Netherlands, have invented certain new and useful Improvements in Means for Damming Up Semisolid Substances, of which the following is a specification.

My invention refers to a method of pumping or damming up semi-solid bodies by means of viscosity pumps and more especially pumps working with helical grooves.

Liquid and semi-solid bodies show a different action in viscosity pumps. As an example the viscosity threads deserve mentioning, which seal a chamber standing under pressure against another chamber. This pressure shall be called hereafter "packing pressure." This is done for instance by means of a viscosity thread pressing back the liquid contained in the pressure chamber, or else a packing pressure is generated by means of a viscosity thread and a viscous liquid, especially oil, which pressure is higher than the pressure to be sealed off and is destined to prevent the viscous liquid held under packing pressure from leaking out by means of a counter thread, which is able to generate a pressure corresponding to the packing or damming-up pressure.

With viscous liquids it is sufficient that the counter thread be constructed for the same pressure as the main thread; but if semi-solid bodies are used—such as grease and the like—the grease oozes out on the side of the counter thread averted from the packing, if the counter thread is constructed for the same pressure as the main thread. The reason for this is given in the peculiarity of the semi-solid bodies that only then the viscosity acts fully, when a close contact is established between the individual particles and with the walls between which the viscosity action is to take place. This pressure is called the "adhesion and cohesion pressure." If this is not the case, as in the counter thread for oils previously mentioned, parts of the grease are pressed through the thread by the pressure without any sufficient adhesion taking place on the walls or within the grease itself, and not sufficiently close contact takes place between the particles and the wall.

The thread really forms a viscosity pump. In contradistinction to centrifugal pumps, for instance, to screw pumps, to gear wheel pumps, to turbine pumps and so forth, the action of the viscosity pumps depends on making use of the viscosity, the cohesion of the particles of the liquid and their adhesion to the walls to create pressure and to convey the liquid.

According to my present invention, now, the indispensable close contact of the parts of the semi-solid body, between themselves and with the walls is generated in any suitable way, for instance by generating a pressure inside the body. This does not apply to the previously mentioned counter thread for maintaining a pressure only, but generally to the pumping of semi-solid bodies by means of viscosity. This pressure can be generated in any suitable manner. In counter threads the generation of the adhesion pressure is done by applying more thread than would be necessary to generate a pressure equal to that generated by the main thread, if the viscosity were in full action. Thus the counter thread is calculated for a higher pressure than the main thread. The necessary adhesion pressure may also be generated in other ways, e. g., by centrifugal action; likewise the adhesion pressure can be generated, e. g. by means of a wiper. In the case of a counter or insulation thread for the generation of the adhesion pressure a resistance may be inserted in the way of the grease, which moves in the insulation thread against its pumping direction. This resistance may be any throttling or packing. The invention is not restricted to the constructions previously described in detail, but it comprises as well all modifications thereof.

In the drawings affixed to this specification and forming part thereof a device embodying my invention is illustrated diagrammatically by way of example.

The shaft $a$ rests in the bearing $b$; the lubrication of this bearing is done by grease stored in the receptacle $f$. The viscosity thread $c'$ leads the grease with pressure towards the supporting face $l$. According to the invention a counter thread $s^2$ is arranged on the other side of the supporting face which is able to generate a higher pressure than that prevailing in the grease which wets the supporting face $l$. Finally the oozing out of the grease on the side, where the admission of the grease takes place, is prevented by a third thread $s^3$.

The new appliance is especially suitable for a bushing, for the revolving part. By one of two threads grease is pressed along, which, being kept back by the counter thread, is held at a very high pressure and thus sealed the pressure chamber filled with a liquid or the like.

I wish it to be understood that I do not desire to be limited to the exact details of construction shown and described, for obvious modifications will occur to a person skilled in the art.

I claim:—

A device for placing viscous substances under pressure comprising in combination, members in contact with one another, one being adapted to revolve relatively to the other, a spiral groove in the contact surface of one of said members, means for feeding a viscous substance into the suction end of said groove and another spiral groove in the contact surface of one of said members arranged to feed towards the pressure end of said first groove.

In testimony whereof I affix my signature.

JACOB EMIL NOEGGERATH.